UNITED STATES PATENT OFFICE.

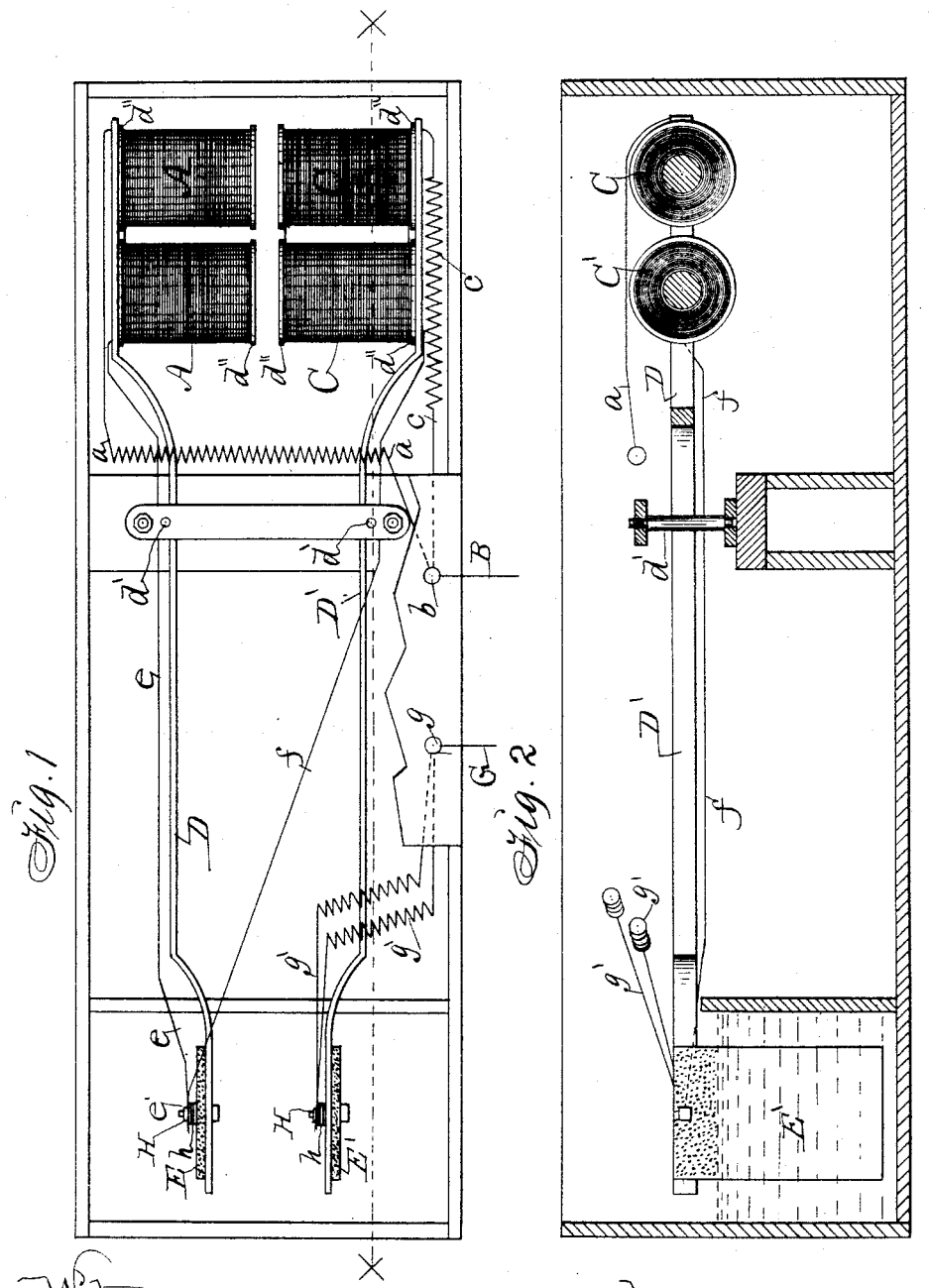

WILLIAM MORRISON, OF DES MOINES, IOWA, ASSIGNOR TO THE HESS ELECTRIC STORAGE BATTERY COMPANY, OF SAME PLACE.

AUTOMATIC REGULATOR FOR ELECTRIC CURRENTS.

SPECIFICATION forming part of Letters Patent No. 439,417, dated October 28, 1890.

Application filed February 17, 1890. Serial No. 340,780. (No model.)

*To all whom it may concern:*

Be it known that I, WILLIAM MORRISON, a citizen of the United States of America, and a resident of Des Moines, in the county of Polk and State of Iowa, have invented a new and useful Automatic Regulator for Electric Currents, of which the following is a specification.

My invention is an automatic regulator designed to be connected with the main circuit and a given number of electric lamps or other working resistance to automatically control the electro-motive force of the generator, which in a case where a dynamo is used accomplishes the desired result without altering in any way the velocity of rotation of the armature, shifting commutators, or cutting-out lengths of exciting-helices of field-magnets, and which in case batteries are employed calls into play only such electric energy as is necessary to actuate such lamps as are in use.

My invention consists, primarily, in the arrangement of sets of helices in pairs, the cores of which are opposite one another and having their like poles facing each other, said helices being connected in the main circuit, pivoted levers having a portion of their lengths connected to the bobbin of said helices near one of their ends, and depending plates or rods secured to their opposite ends, so disposed as to be suspended within a liquid-resistance medium, and in certain details of construction and connection of wires hereinafter more particularly described.

In the accompanying drawings, Figure 1 represents a top view of my improved regulator, shown within an inclosing-case, and Fig. 2, a side view of the same on the line $x\ x$ of Fig. 1.

A A' are a pair of solenoid-helices connected in circuit with the main lead B through binding-post $b$ by the wire $a$. C C' are a pair of solenoid-helices connected in circuit with the main lead B through binding-post $b$ by the wire $c$. If desired, each of the helices of each pair may be wound differentially to one another; but each of the ends of the helical pairs facing each other are of like polarity.

D D' are levers secured to or formed integrally with pivot-pins $d\ d'$, bolted together, as shown, the said helices being insulated by the flanges $d''\ d''$ of their bobbins, which said flanges are of suitable insulating material. Said levers D D' have a portion of their length at one of their ends secured, respectively, to the two pairs of helices A A' and C C', and have each secured to their other and remaining ends depending plates or rods E E' of suitable material, said plates being thus suspended within the liquid-resistance medium, which may be of such a character as is found to maintain the desired resistance.

The helix A' is connected with the plate E by means of connecting-wire $e$ at $e'$, while the opposite helix C' is connected with said plate by means of connecting-wire $f$ at the same point.

The main lead G is connected with the plate E' through binding-post $g$ and wires $g'\ g'$.

I preferably interpose between the binding-nuts H H platinum washers $h\ h$ to increase the conductivity.

The operation of my device is as follows: The main lead B being connected with the positive electrode of the generator, the current therefrom is directed through, first, the helices A and C, the two pairs A A' and C C' being in contact when no work is being done on the circuit, from thence directed through the helices A' and C', being from thence directed through connecting-wires $e$ and $f$ to plate E, through platinum washers $h$, from thence through the fluid-resistance medium to plate E', through platinum washers $h$ and connecting-wire $g'$ to the line-wire G of working-circuit. It will now be seen that since the degree of resistance between plates E E' through the fluid-resisting medium depends upon the distance at which said plates are apart from each other and the difference of potential between E and E', depending upon the number of lamps in use in the circuit that the quantity of electro-motive force employed or brought into use is constantly regulated by the relation existing between the resistance of the line of the arc between the plates and the magnetic repulsion of the helices, which action of repulsion is communicated to said plates by the levers D D'.

Since the arc interval between the depending-plates E and E' is proportional to the number of lamps in circuit, it is obvious that the electro-motive force will be automatically regulated, and that if, for instance, but one lamp be in circuit all danger of the burning out of said lamp is obviated, since the helices move the levers D D' but slightly, decreasing the arc interval but slightly between the plates E E', and thus only such an electro-motive force as is necessary to accomplish the given work enters the line.

Having thus described my invention, what I claim as new therein, and desire to secure by Letters Patent of the United States, is—

1. In an electric regulator, the combination, with the working-circuit, of helices whose ends facing each other are of like polarity, said helices being adapted to move relatively to one another in a horizontal plane, connecting-levers, and plates within a liquid resistance, as and for the purposes set forth.

2. An electric regulator having movable helices whose poles facing each other are of like polarity, connecting-levers, and plates depending in a liquid-resistance medium, said helices and plates being connected in main circuit, as and for the purposes set forth.

3. An electric regulator comprising repelling magnetic movable helices, connecting-levers provided with plates depending in a liquid medium of resistance, and a system of connecting-wires, as set forth.

4. An automatic electric-current regulator, composed of the following elements, to wit: a box or frame having a receptacle for liquid at one end, a pair of levers fulcrumed to the box or frame to extend over said liquid-receptacle, a metal plate or other suitable electric conductor connected with one end of each lever to extend therefrom into the liquid in the receptacle, one or more helices fixed to the other end of each lever, and conducting-wires arranged and combined with the wires of an electric circuit to operate in the manner set forth.

WILLIAM MORRISON.

Witnesses:
CHAS. C. BULKLEY.
THOMAS G. ORWIG.